Sept. 4, 1923.  1,467,274

E. J. KEARBY

SELECTIVE POWER TRANSMISSION

Filed July 21, 1920  10 Sheets-Sheet 1

Witness:
R. Hamilton

Inventor,
Earl J. Kearby,
By Thorpe & Gerard
Attorney.

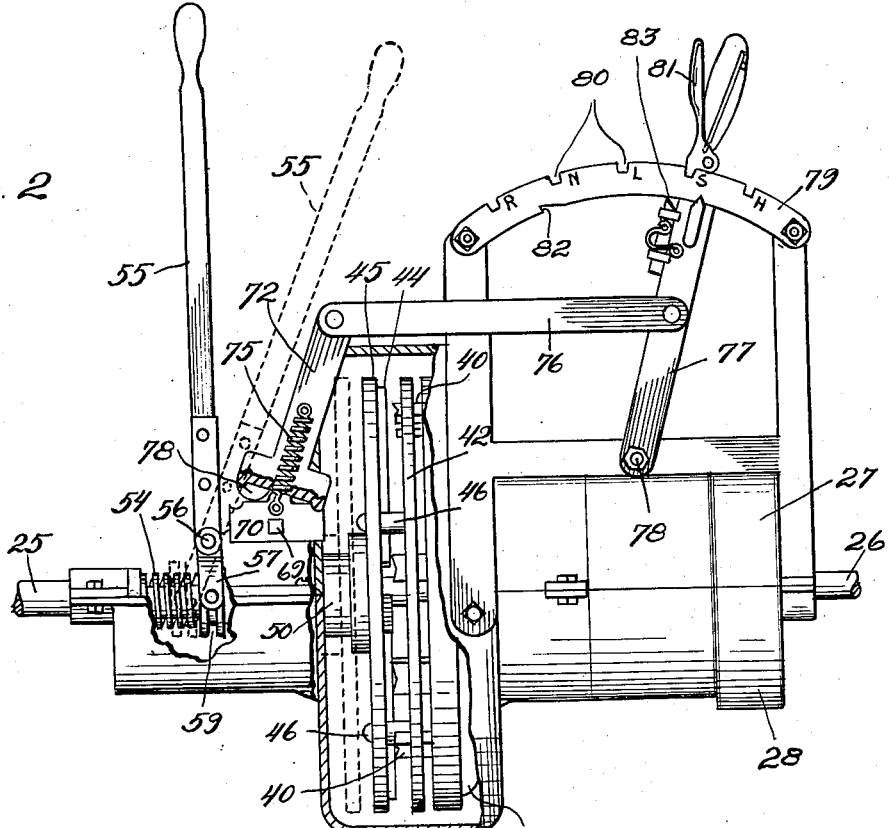

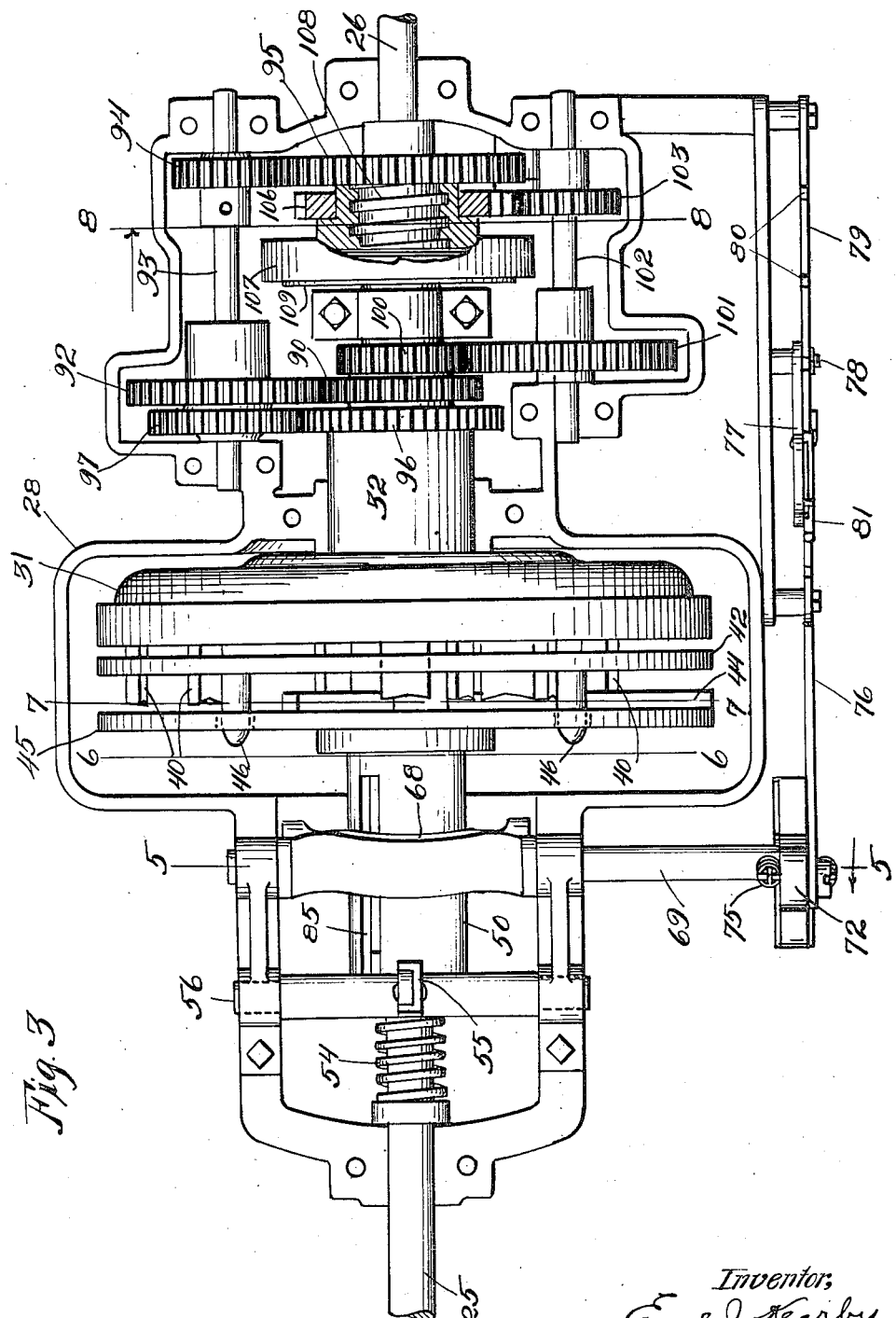

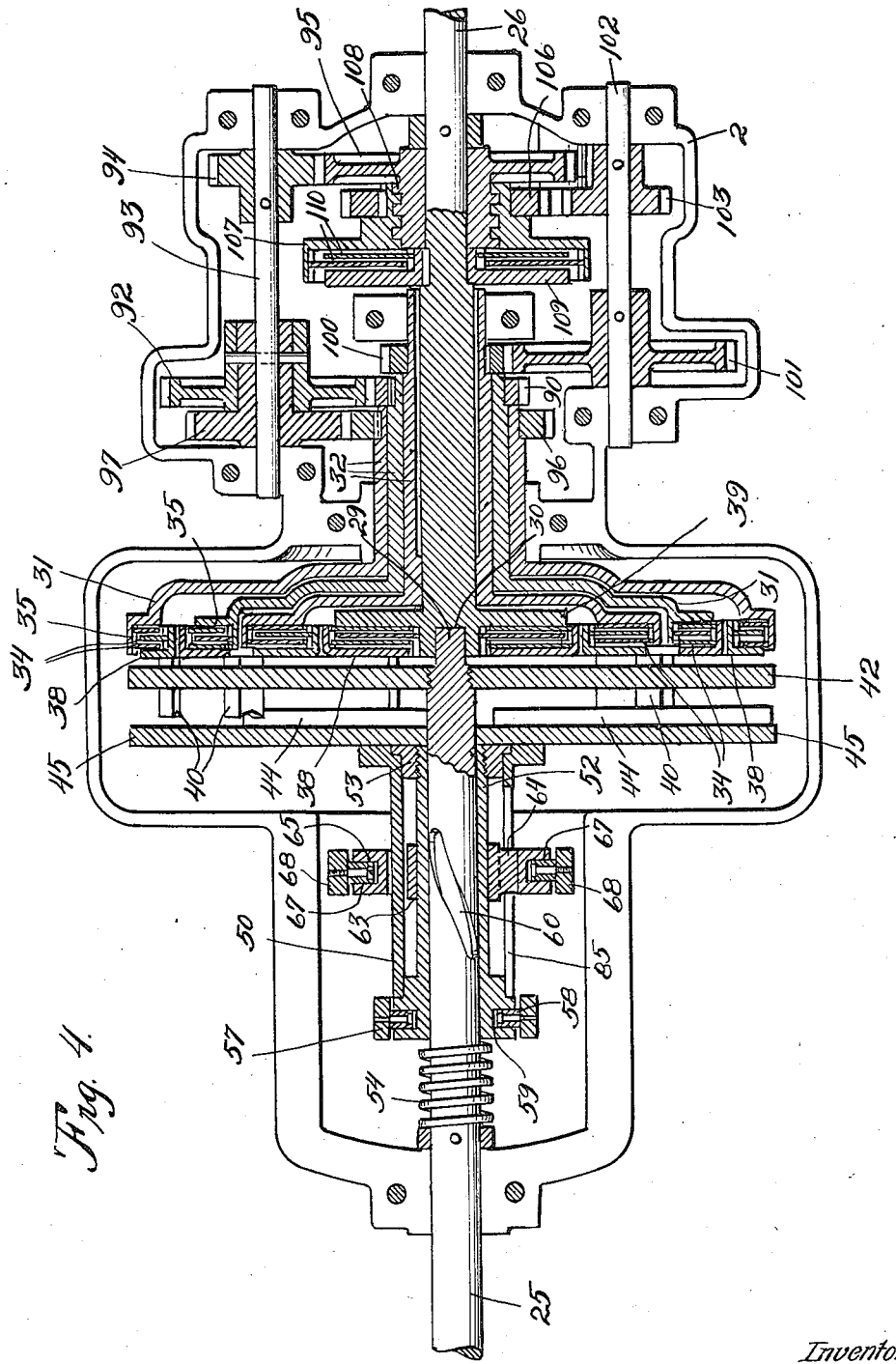

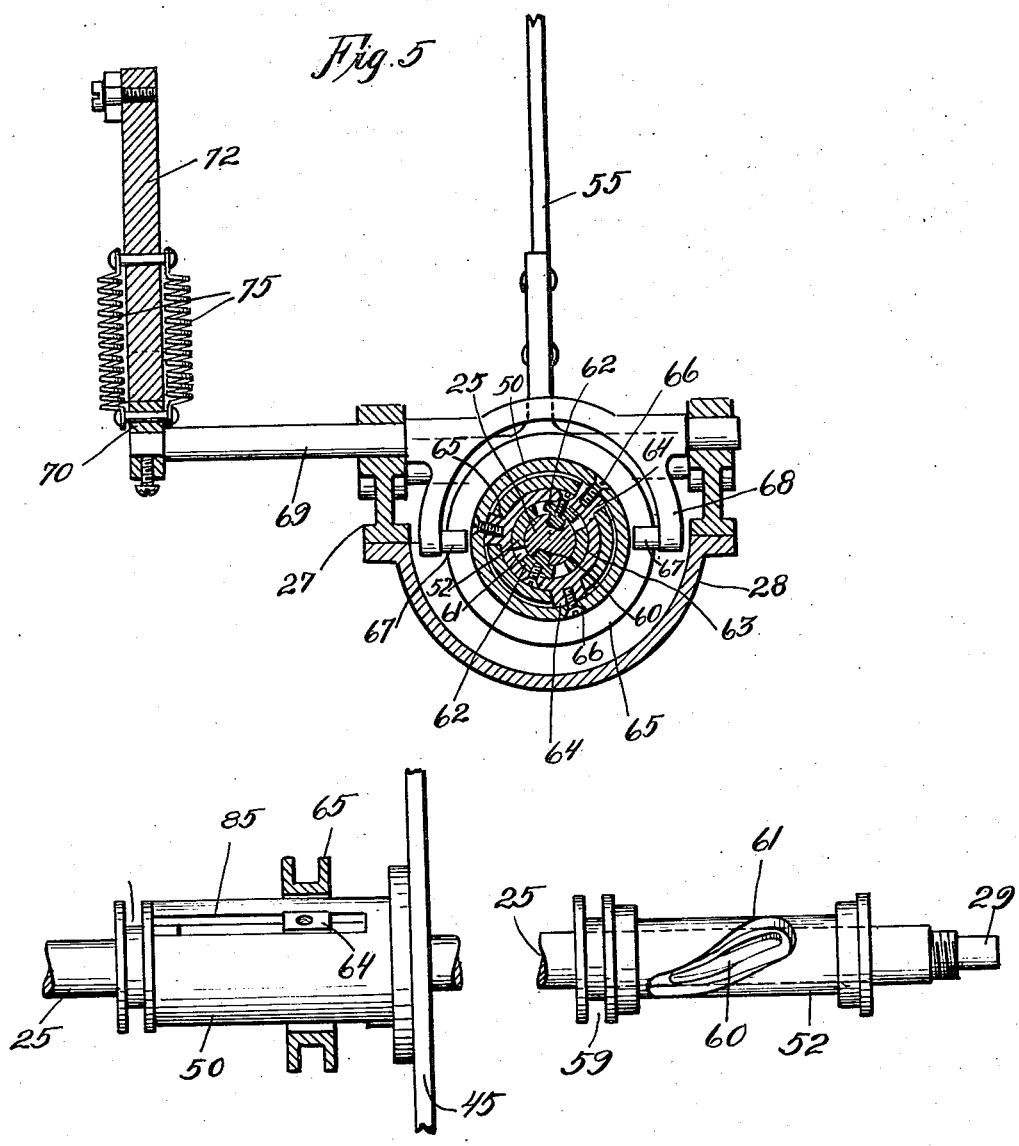

Sept. 4, 1923.

E. J. KEARBY 1,467,274

SELECTIVE POWER TRANSMISSION

Filed July 21, 1920   10 Sheets-Sheet 6

Sept. 4, 1923.

E. J. KEARBY

SELECTIVE POWER TRANSMISSION

Filed July 21, 1920

Witness:
R. E. Hamilton

Inventor:
Earl J. Kearby,
By Thorpe & Evard
Attorneys.

Sept. 4, 1923.  1,467,274
E. J. KEARBY
SELECTIVE POWER TRANSMISSION
Filed July 21, 1920     10 Sheets-Sheet 8

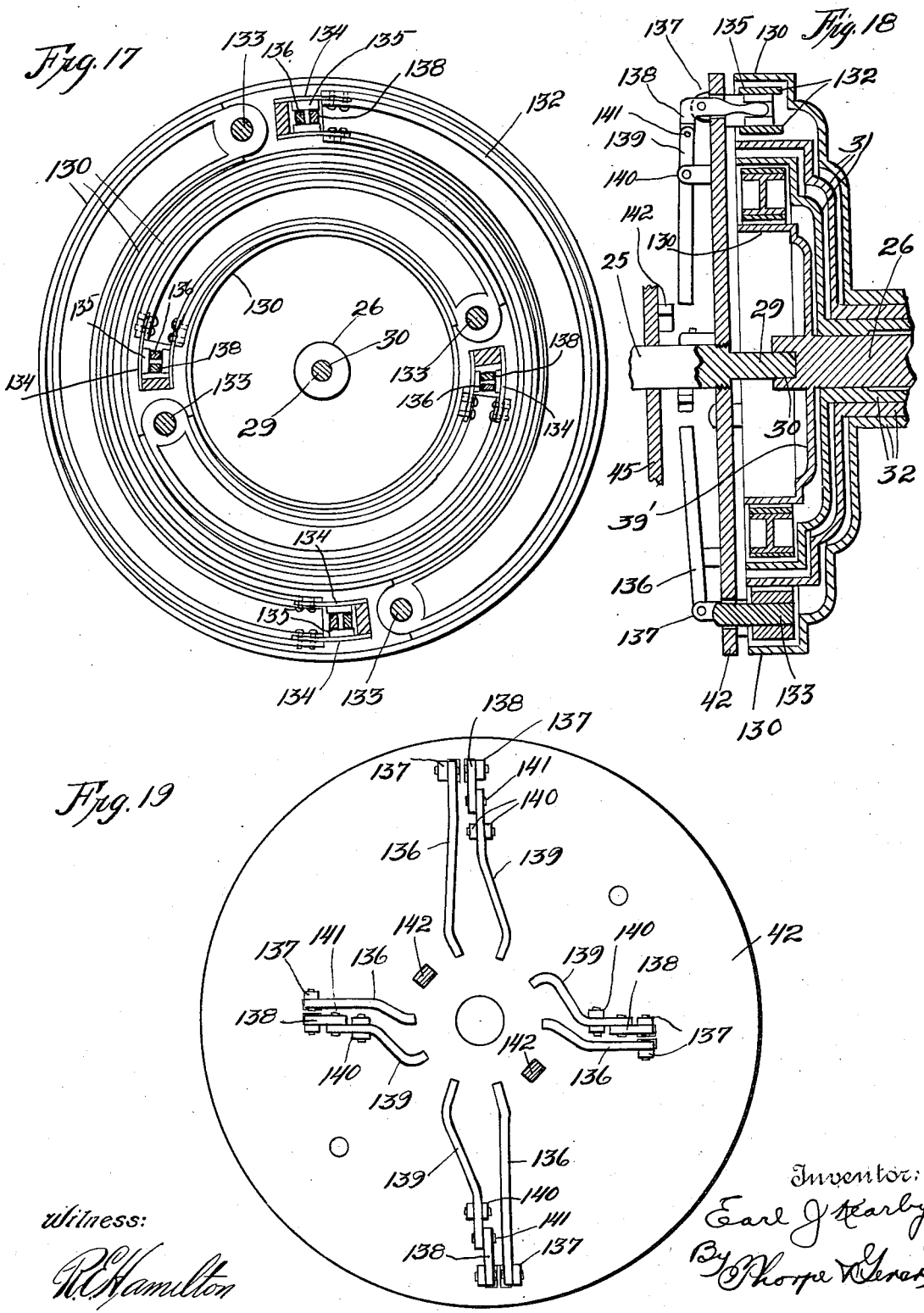

Sept. 4, 1923. 1,467,274
E. J. KEARBY
SELECTIVE POWER TRANSMISSION
Filed July 21, 1920   10 Sheets-Sheet 10
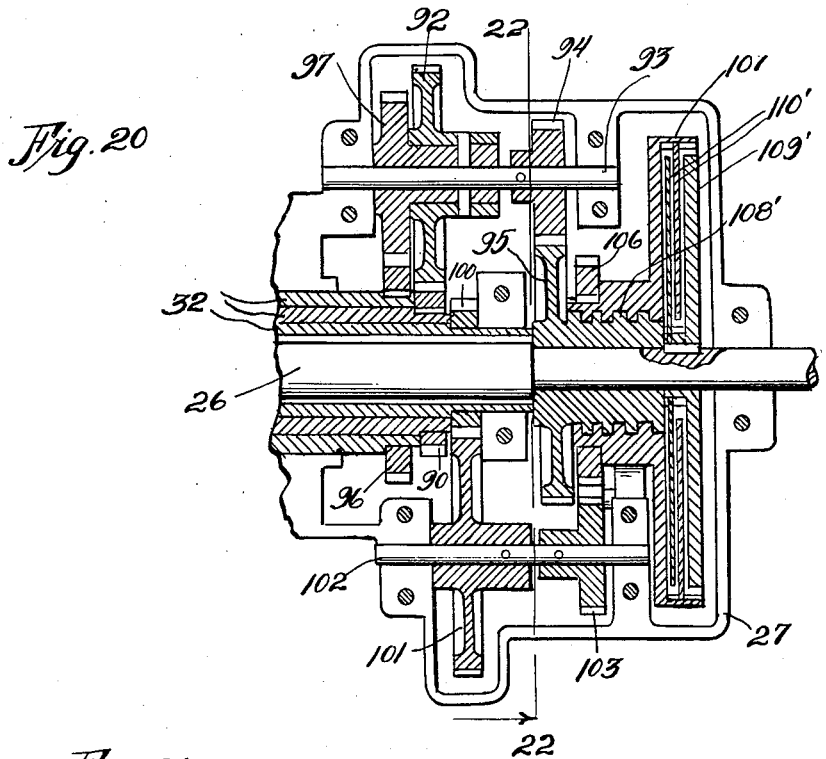
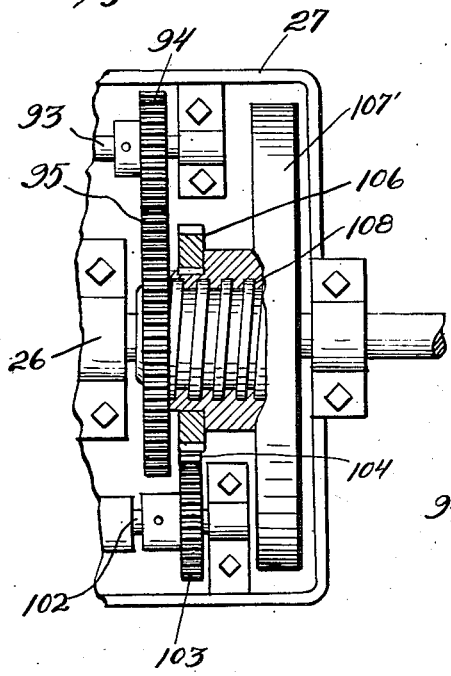
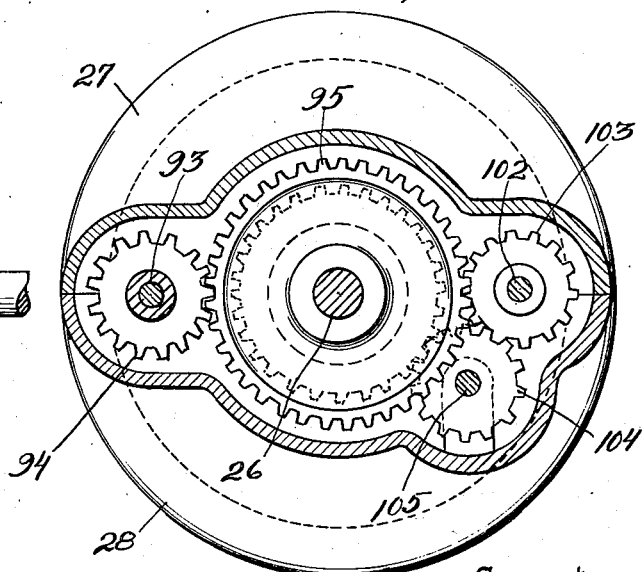

Patented Sept. 4, 1923.

1,467,274

UNITED STATES PATENT OFFICE.

EARL J. KEARBY, OF ST. JOSEPH, MISSOURI, ASSIGNOR OF FORTY-NINE ONE HUNDREDTHS TO MARY E. KEARBY, ONE-FOURTH TO MAURICE S. FINCH, AND ONE-FOURTH TO JOHN A. MUCHENBERGER, ALL OF ST. JOSEPH, MISSOURI.

SELECTIVE POWER TRANSMISSION.

Application filed July 21, 1920. Serial No. 397,917.

*To all whom it may concern:*

Be it known that I, EARL J. KEARBY, a citizen of the United States, residing at St. Joseph, in the county of Buchanan and in the State of Missouri, have invented a certain new and useful Improvement in Selective Power Transmission, of which the following is a complete specification.

This invention relates to power transmission mechanism, and aims to provide a novel and practical type of selective power transmitting mechanism adapted for efficient use in connection with automobiles and other forms of motor-driven vehicles requiring a transmission mechanism providing for the usual changes of speed as well as for the reversal of drives characterizing the ordinary operation of vehicles of this class.

Accordingly, it is one of the objects of this invention to provide a selective power transmitting mechanism which comprises, in combination with driving and driven shafts, a variable speed and reversing gearing construction having means for mechanically selecting any one of the change speed or reverse gears, according to requirements.

A further feature of the improvement lies in the provision of a novel form and arrangement of clutching mechanism forming a part of the means whereby the desired selective speed changes, as well as reversal of the drive are effected.

One preferred form of embodiment of the improvements comprises a plurality of change speed and reversing gears including clutch mechanism for connecting the driving and driven shafts, with the clutch devices concentrically arranged about the axis of the driving shaft with the operative faces of said devices arranged substantially in a common plane and provided with suitable manually controlled means operable to selectively actuate any one of the clutch devices for obtaining either the reversal of the drive or any one of the speeds afforded by the change speed gearing. The selective mechanism which I have devised comprises a clutch actuating member provided with a suitable manually controlled lever which is adapted to be set either into neutral or any one of the speed changing or reversing positions, for correspondingly positioning the clutch actuating member and thereby actuating the proper clutch device. The arrangement is such that the shifting movements of the speed changing or reversing mechanism may be carried out at any time while the gears and their connections are in motion, with but a momentary interruption in the drive through the transmission.

It is also sought to provide an improved type of clutch connection between the change speed and reverse gearing and the driven shaft, for which purpose we have devised an arrangement of clutch elements and screw operated devices which are driven by said gearing for actuating the clutch elements into clutch relations.

With the foregoing general objects in view, the invention will now be described by reference to the accompanying drawings, illustrating different forms of embodiment of the proposed improvements, after which the novel features of the construction will be specifically set forth and claimed.

In the drawings:

Fig. 2 is a similar view, partly broken away, but showing another position of the speed changing or shifting mechanism, the broken lines in said view representing the operative position of the lever for re-tracting the clutch actuating member;

Fig. 3 is a plan view of the construction, with the upper section of the housing or casing omitted;

Fig. 4 is a horizontal section taken on the line 4—4 of Fig. 1, but on an enlarged scale;

Figs. 5, 6, 7 and 8, are transverse sections taken on the lines 5—5, 6—6, 7—7 and 8—8, respectively, of Fig. 3;

Fig. 9 is a detail sectional view of one of the clutch devices.

Figure 12:
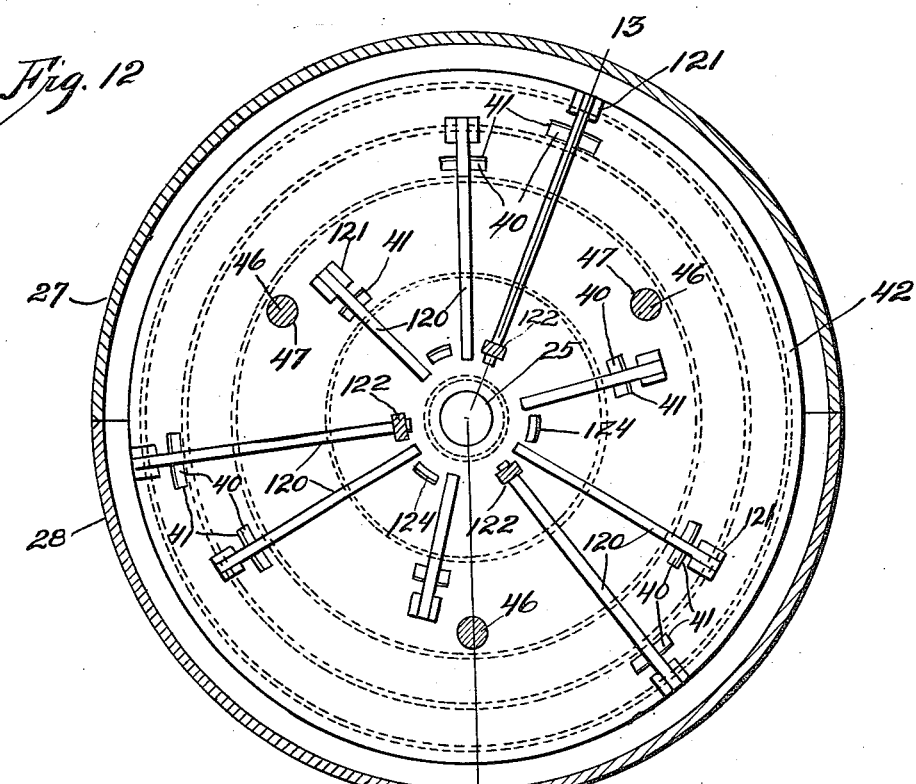
Figure 13:
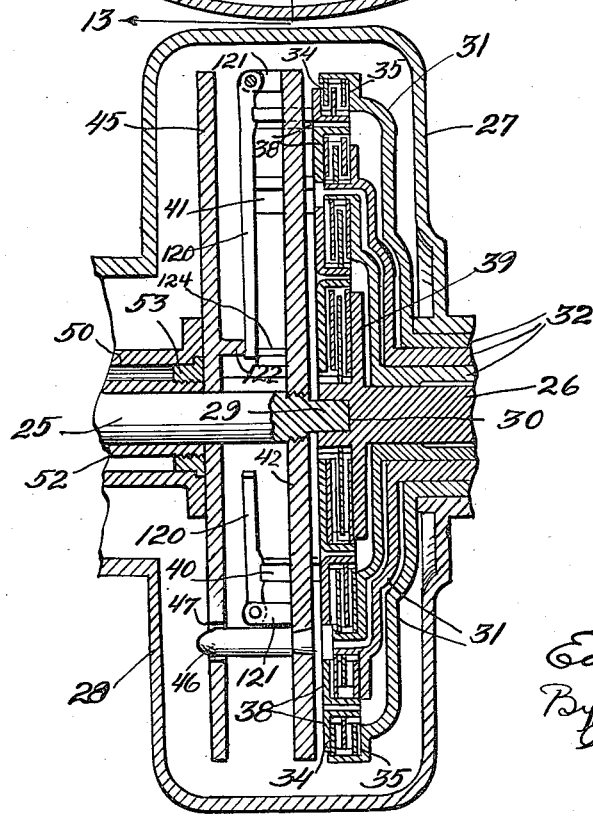
Figure 14:
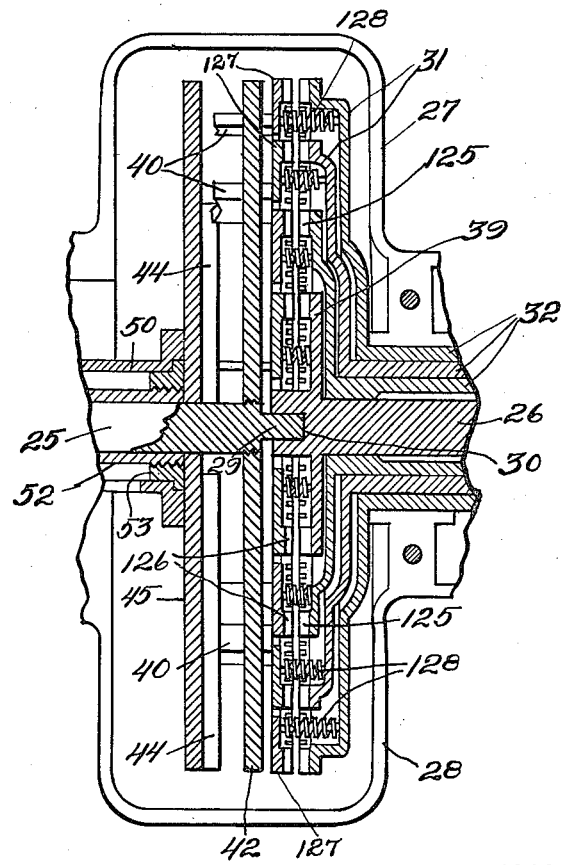
Figure 15:
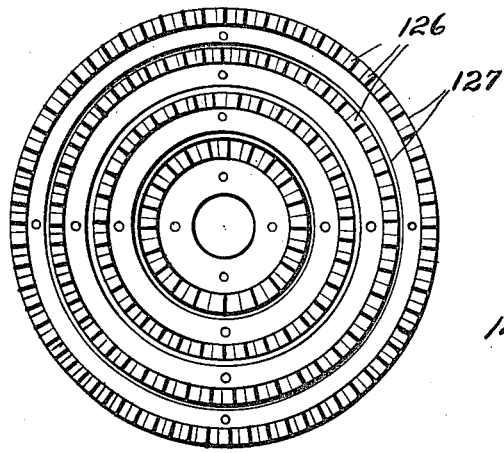
Figure 16:
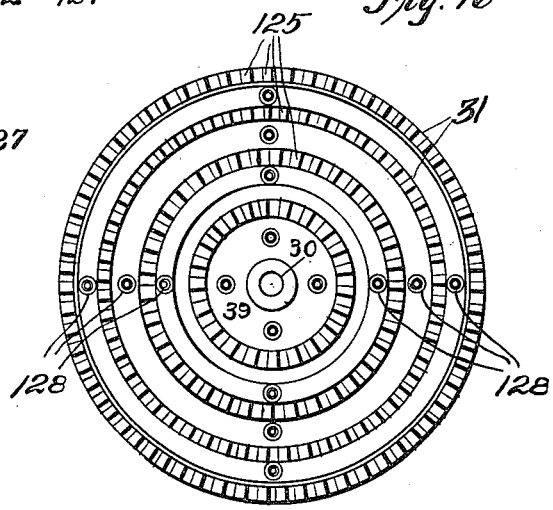

Fig. 10 is a detail view of the sleeve portion of the clutch actuating member;

Fig. 11 is a detail view of certain of the parts for effecting the oscillating movement of the clutch actuating member;

Fig. 12 is a transverse sectional view, showing a modified form of construction of the selective means of the clutch actuating mechanism;

Fig. 13 is a central sectional view of the same, representing a section taken at right angles to the view shown in Fig. 12;

Fig. 14 is a sectional view showing a modified form of construction of the clutch devices;

Figs. 15 and 16 represent face views of the two sets of clutch elements, respectively, employed in the construction illustrated in Fig. 14;

Fig. 17 is a sectional view illustrating a modified form of construction of the clutch devices with selective actuating means therefor;

Fig. 18 is a central sectional view, taken at right angles to the view shown in Fig. 17;

Fig. 19 represents a face view of the clutch actuating parts illustrated at the left in Fig. 18;

Fig. 20 is a detail sectional view illustrating a modified form of clutch operating connections for the reverse and change speed gearing;

Fig. 21 is a detailed plan view of the same, partly broken away:

Fig. 22 is a transverse section taken on the line 22—22 of Fig. 20.

Referring now to the drawings in detail, and more particularly to Figs. 1 to 4 in the first instance, these illustrate the improved power transmission mechanism as applied to a driving shaft 25 and a driven shaft 26, connected together in alinement within a suitable casing or housing comprised of the upper and lower sections, 27, 28, this housing structure providing the necessary bearings for said shafts, 25 and 26, and also for the minor shafts for mounting the various gears, as hereinafter described.

At the meeting ends of the shafts 25 and 26, the shaft 25 is formed with a nipple portion 29, which is received within a recess 30 in the corresponding end of the shaft 26, thereby tending to insure the proper alinement of these meeting end portions of said shafts.

Mounted upon said end portion of the shaft 26 is a plurality of clutch devices each of which comprises a disc housing portion 31, and a sleeve portion 32, the several housing portions 31 and sleeves 32 being of successively decreasing diameter, as shown in Fig. 4 so that the housing portions 31 are embraced one within the other, while their sleeve portions 32 are concentrically mounted upon the shaft 26, with each sleeve forming the bearing for the next outer sleeve 32.

Each of the housing portions 31 is provided with a set of multiple disc clutch elements, 34, fitted within a recess or pocket 35 within the outer marginal portion of each housing portion 31. The drawings illustrate each clutch device as provided with a set of three of the clutch elements 34, and the outer clutch element 34 provided with lugs or projections 36 engaging notches 37, which are formed in the pocket 35 of the housings 31 (see Fig. 9). The inner clutch element of each of the sets of said elements 34 is also provided with lugs or projections 36 engaging with notches 37 formed upon a clutch actuating member 38, there being a clutch actuating member 38 for each of the sets of clutch elements 34.

A further set of multiple disc clutch elements 34 with a clutch actuating member 38, is provided for making a direct clutch connection between the shafts 25 and 26, the shaft 26 being formed with a disc portion 39 in the same plane as the bottom portions of the several pockets 35, on the disc or housing portions 31, as is clearly illustrated in Fig. 4. It is thus apparent that all of the clutch devices are mounted together in concentric relation to the axes of both the driving and driven shafts, 25, 26, and with the operative faces of all said devices in substantially a common plane, conveniently adapted for making operative connection with the clutch actuating members and also the selective speed changing and reversing mechanism, as will now be described.

Referring now more particularly to Figures 3, 4, 6 and 7, each of the clutch actuating members is provided with a series of fingers or posts 40 projecting forward and parallel to the shaft 25, and arranged in different radial positions, but at equal distances apart. These fingers or posts 40 project forward through guide slots or passages 41, formed in a disc 42 which is fixedly secured to the end portion of shaft 25 adjacent to the nipple 29. The several sets of slots or passages 41 are arranged in different radial positions in the disc 42 so that the several sets of posts 40 are thus maintained by said disc 42 in their different predetermined radial and relatively fixed positions, with reference to shaft 25 due to the fixed relation of the openings 41 and the fixed position of the disc 42 upon said shaft 25. The ends of the fingers or posts 40 are slightly recessed and adapted for engagement by a set of radial ribs 44 provided on the rear face of a clutch actuating disc 45; this disc 45 is adapted to be intermittently locked with the disc 42 by means of a set of pins 46 carried by one face of the disc 42 engaging a set of openings 47 in the disc 45, the number and arrangement of the openings 47 being such as to permit engagement with the pins 46 for any one of the relatively different positions of the discs 42 and 45.

The clutch actuating disc 45 is mounted for both oscillatory movement about the axis of the shaft 25 and for longitudinal movement thereon, being secured to the end of a pair of sleeves 50, 52, separated by a spacing collar 53 at the front face of the disc 45. The other end of the inner sleeve 52 abuts against a strong coil spring 54 carried by the shaft 25, and operating to maintain the disc 45 normally engaged with the pins 46, and with the ribs 44 of said disc in operative engagement with one or the other of the sets of posts or fingers 40, unless the disc 45 is in neutral position out of engagement with any of said posts or fingers 40. The disc 45 and its sleeves 50 and 52, may be retracted against the action of the spring 54 by means of a suitable lever 55, shown as a hand lever (see Fig. 1) but which may be adapted for foot operation, if desired; said lever being fulcrumed at 56 and provided with a yoke portion 57 having rollers 58 operating in an annular groove 59 formed in the end of the sleeve 52, as shown in Fig. 4.

Figure 1:
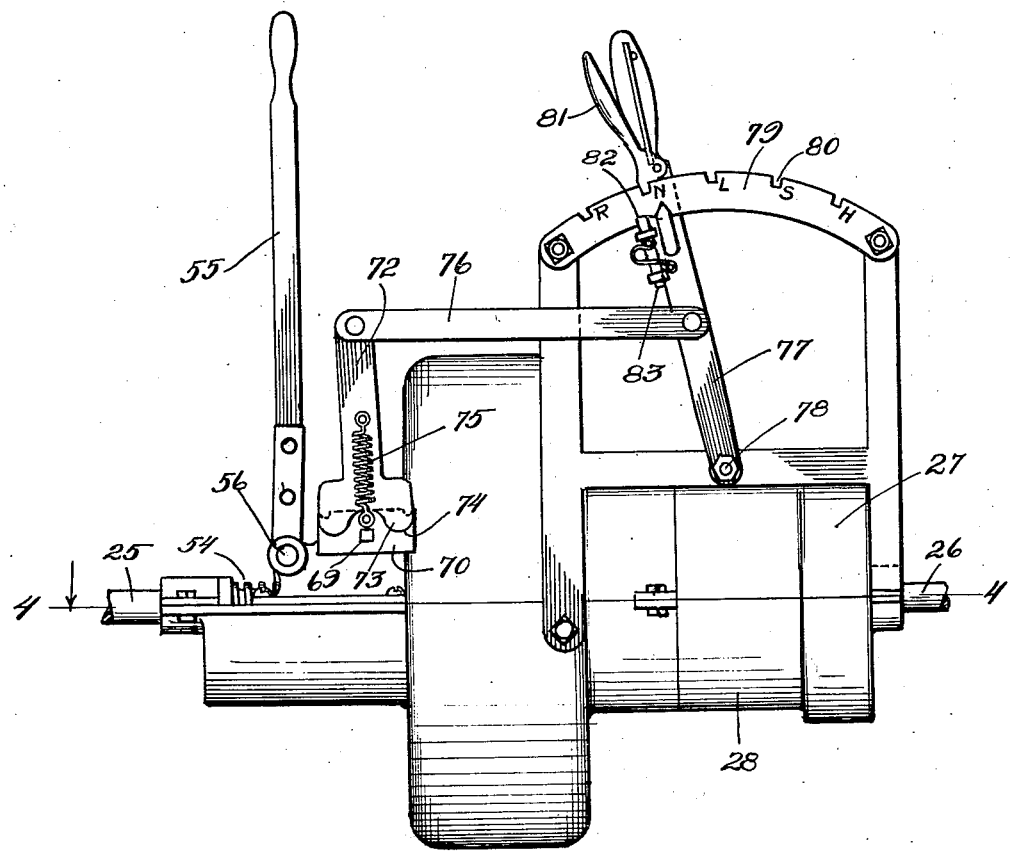
Fig. 1 is a side elevation illustrating a selective power transmission, constructed according to the present invention.
Figure 8:
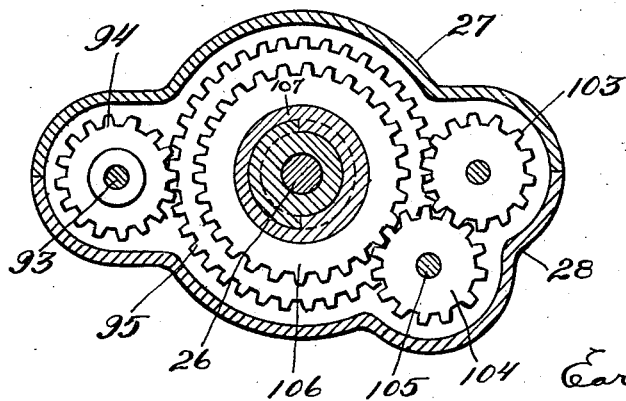
Figure 7:
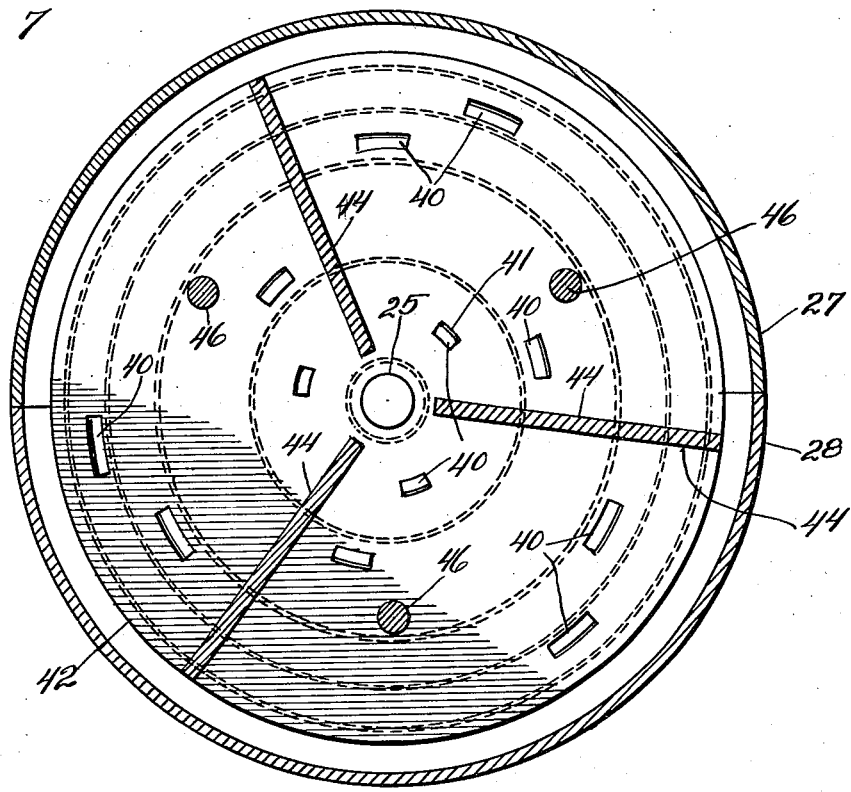
Figure 6:
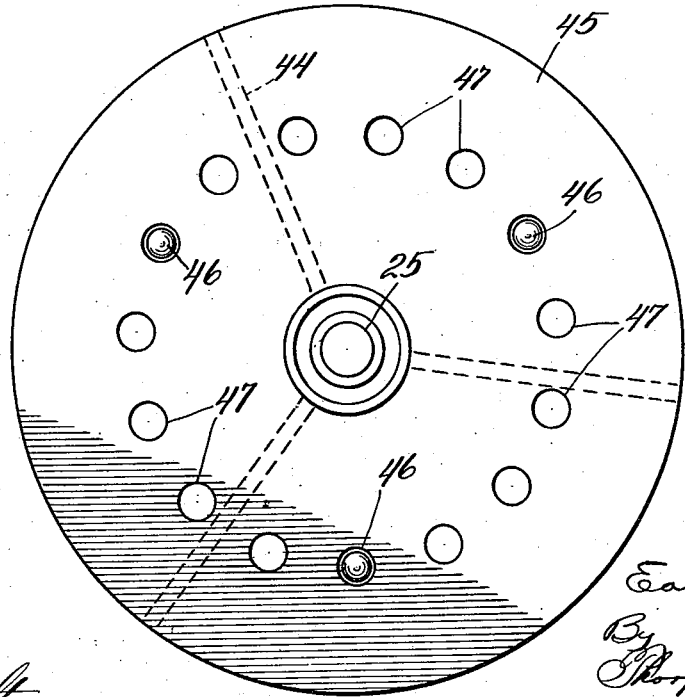

For oscillating the disc 45 in the selective positioning of the same for effecting the speed changes in the transmission or reverse of the drive, the shaft 25 is formed with a pair of helical grooves 60 (see Figs. 4, 5, 10, and 11), matching which is a pair of irregular slots 61, formed in the inner sleeve 52, each pair of grooves 60 and slots 61 accommodating a pair of blocks 62 secured to the interior of a collar 63 accommodated within the space between the sleeves 50 and 52. Projecting from the exterior of this collar 63 is a set of lugs 64 operating within slots 85 formed longitudinally in the exterior sleeve 50, a grooved collar 65 being secured by screws 66 to the set of lugs 64. Operating within the groove of the collar 65 is a pair of rollers 67 carried by a yoke member 68 which is secured to a rocker shaft 69. To one end of the shaft 69 is secured a block 70 (see Figs. 1 and 5) with which is engaged an operating arm 72 having lobe portions 73 adapted to fit in seats or recesses 74 formed in the block 70 at opposite sides of the end of the shafts 69, a pair of springs 75 being secured to the arm 72 and block 70, respectively, at opposite sides of said arm 72, and operating to maintain the latter with its lobe portions 73, both normally seated within the recesses 74, as shown in Fig. 1. The upper end of the arm 72 is connected by a bar 76 with a lever 77 pivoted at 78 and operating along a segment 79, formed with suitable notches 80 representing the various operative positions of said lever and adapted, by engagement with its latch member 81, to maintain the lever in any one of its said positions. For the neutral position of said lever, represented by the character "N", the segment 79 is provided with an auxiliary notch 82 for engagement with an auxiliary latch bar 83 to secure against any casual displacement of the lever 77.

Referring now to Figures 3 and 4, the low speed gear connections from the clutch devices comprise a gear 90 on the intermediate sleeve 32 and meshing with a gear 92 on a counter shaft 93, which also carries a gear 94, and which in turn meshes with a gear wheel 95 journaled on the driven shaft 26. The second speed gear connections comprise a gear 96 secured to the end of the outermost sleeve 32 and meshing with a gear 97 on the counter shaft 93, the ratio of said gears being, of course, so chosen as to obtain an increased driving speed of the shaft 93 as compared to the rate of drive derived from the gears 90 and 92. The highest rate of speed possible with the transmission is that obtained by clutching the shafts 25 and 26 directly together through the clutching action of those clutch devices corresponding to the clutch disc 39. The gear connections for the reverse drive comprise a gear 100 secured to the end of the innermost sleeve 32 and meshing with a gear wheel 101 on a counter shaft 102, which shaft 102 also carries a gear 103 meshing with another gear 104 on a stub shaft 105 (see Fig. 8), this gear 104 meshing in turn with a gear wheel 106. The gear 106 is slidingly keyed (see Fig. 4) upon the hub portion of a clutch member 107, which is internally screw-threaded for fitting a screw thread 108 formed upon the exterior of the hub portion of the gear wheel 95. Keyed to the shaft 26 adjacent to the clutch member 107 is a clutch disc 109, adapted to cooperate with the clutch member 107 through a set of clutch elements 110 respectively keyed to the disc 109 and said member 107. The action of this screw-operated clutch construction is such as to clutch the shaft 26 with either the low speed, intermediate or reverse drive gearing. In the case of the low and intermediate speed gearing, the gear 95 operates the screw thread to drive the clutch member 107 forward into clutched relation to the disc 109, so that the shaft 26 is thus driven in the same direction as the gear 95. In the case of the reverse gearing, the clutch member 107 is operated directly from the gear 106 and in the proper direction along the thread 108 to clutch said member 107 with the disc 109, whereupon the shaft 26 is driven in the opposite direction from the shaft 25. In this reverse driving operation, the low and intermediate speed gear and clutch members are, of course, rotated idly (in the opposite direction from their normal operation) but this is not an objectionable feature since the reverse gearing is never operated at any high rate of speed. In the case of the direct drive connection, however, only the clutch disc 109 is operated, and in the event of any contact between it and the remaining clutch elements 110 and 107, the member 107 will be retracted along the screw thread 108 and out of clutched relation with the disc 109, the result being that the low speed, intermediate and reverse drive gearing will remain entirely inoperative so long as the direct drive continues.

The operation of the construction so far described will be readily understood from the foregoing, but the different steps in the speed changes and reversal of the drive may be briefly indicated as follows. When the lever 77 occupies the position shown in Figure 1, which is the neutral position of the transmission, this serves to maintain the disc 45 with its ribs 44 out of engagement with any one of the sets of posts or fingers 40 so that consequently there will be no actuation of any of the devices 38 into clutch-engaging position, and no driving action will be transmitted from the shaft 25 to the shaft 26 so long as the lever 77 occupies this position. To obtain the low speed transmission, the lever 77 will be shifted to the position indicated by the character "L," which will cause the lower end of the lever 72 to be rocked relatively to the block 70 on the shaft 69, against the tension of the springs 75. Now by the operation of the lever 55, the disc 45 is retracted against the action of the spring 54, resulting in disengagement of the pins 46 from the openings 47 in the disc 45. Since the disc 42 is fixed to the shaft 25, the disc 45 rotates under the action of springs 75 tending to restore the normal relative position between the block 70 and the lobes 73 on the lower end of the lever 72. These lobes 73 of said lever 72 thus constitute limiting stops, whereby the amount of rotation of the shaft 69 is regulated and limited in accordance with the position of the lever 77 along the segment 79. This rocking of the shaft 69 of course regulates the position of the sleeves 50 and 52 longitudinally along the shaft 25, and correspondingly controls the position of the disc 45 which is fixed to said sleeves. Simultaneously with the longitudinal shifting movement of disc 45, there also is a rotary or oscillatory movement caused by the helical grooves 60 in the shaft 25, operating in conjunction with the collar 63, which is attached to the outer sleeve 50. By means of this combined longitudinal and oscillatory movement, the disc 45 is so positioned as to present its ribs 44 opposite to and in register with those posts or fingers 40 which are carried by that actuating member 38 corresponding to the clutch elements of the intermediate housing portion 31 which is carried by the intermediate sleeve 32. Now when the lever 55 is thrown back into the position illustrated by the full lines in Figure 2, the disc member 45 is actuated by the spring 54 to engage the ribs 44 of said disc 45 with the said posts 40, and at the same time the discs 42 and 45 are latched together by means of the pins 46, for which, as has already been stated, there are openings 47 provided for every one of the relative positions of the discs 42 and 45. The driving shaft 25 is now clutched with the shaft 26 through the medium of the intermediate clutch actuating member 38 and the gearing and screw clutch elements associated therewith, the gear 95 operating to automatically screw the clutch elements 107, 110 and 109 into clutched relation with said shaft 26, as has already been explained.

In this connection it is pointed out that instead of the described sequence of operation, the operation of the two levers 77 and 55 may, under average conditions, be carried out practically simultaneously, so that very little tension will be placed upon the springs 75, and the oscillation of the disc 45 will follow directly upon the shifting of the lever 77, as will be readily understood.

On changing to second or intermediate speed, the lever 77 is shifted into the position shown in Figure 2 which will, on operation of the other lever 55 as well, result in positioning the ribs 44 of the disc 45 opposite to or in register with those posts or fingers 40 corresponding to the outer housing portion 31 carried by the outermost sleeve 32, so that the driving shaft 25 thus obviously becomes clutched for driving the shaft 26 through the gears 96 and 97 corresponding to said outermost sleeve and clutch member 31 and 32, the clutching action between the gear 95 and said shaft 26 taking place automatically the same as before.

On shifting the lever 77 into high speed position, accompanied by shifting movement of the lever 55, the disc 45 is so positioned as to present its ribs 44 opposite to or in register with those posts or fingers 40 which correspond to the middle or innermost clutch actuating member 38, which obviously results in a direct driving connection between the two shafts 25 and 26, and in automatic unclutching of the shaft 26 from the low, intermediate and reverse gear connections.

If now the lever 77 is shifted in the opposite direction into reverse drive position, as indicated by the character "R" in Figures 1 and 2 of the drawings, the disc 45 will be so positioned as to present its ribs 44 opposite to or in register with those posts or fingers 40 which correspond to the clutch actuating member 38 for operating the low speed and direct drive clutches, respectively, that is, the clutch actuating member 38 which corresponds to the clutch devices associated with the innermost sleeve 32, and connected with the gear 100. It will thus be seen that the shaft 25 will become clutched with the reverse gearing including the gears 100, 101, 103, 104, and 106, the latter actuating the screw clutch devices 107, 109, and 110 into clutched relation in the manner above explained, and the arrangement of the reverse gearing being such as to rotate the shaft 26 in the opposite direction from the shaft 25.

Referring now more particularly to Figures 12 and 13 of the drawing, these views illustrate a modified form of clutch actuating means for connecting the disc 45 with the clutch devices. This modified construction employs a somewhat different type of means for engaging the posts or fingers 40, which means comprises a series of levers 120 fulcrumed in posts 121 located at different radial points on the front face of the disc 42. The length of the levers 120 is such that they all terminate at practically the same distance from the center of the disc 42, there being three of said levers for each one of the clutch actuating devices 38, the levers 120 of each set being substantially the same distance apart. The rear face of the disc 45 is also provided with a set of lugs 122, in lieu of the radial ribs 44 of the previous construction, the lugs 122 being also the same angular distance apart as the levers 120 of each set, so that the movement of the disc 45 is adapted, through the engagement of its lugs 122 with the three ends of any one of the sets of levers 120, to simultaneously actuate all the levers of any one of said sets and thereby operate the clutch elements corresponding to that set of levers. The disc 45 is adapted to be oscillated in the same manner as in the previous construction for altering its position with reference to the various sets of levers 120 for the purpose of selective engagement with the same in accordance with the particular clutch element desired to be actuated. In this modified construction it may also be pointed out that the levers 120 are required only in connection with the clutch devices associated with the sleeves 32 and housing portions 31, the innermost clutch actuating device 38, which is associated with the clutch disc 39, being simply provided with posts 124, which are equally spaced apart and at the same distance from the center of the disc 42 as the posts 122, so that the posts 122 are adapted to be simultaneouly engaged with all the posts 124 for the actuation of the corresponding clutch device 38.

In Figures 14, 15 and 16 is illustrated a still further modified form of clutch actuating means for connecting the disc 45 with the various clutch devices. In this modified construction, the pockets or recesses 35 and the clutch elements 34 are dispensed with, and the housing portions 31 each formed with a set of clutch teeth 125 adapted to cooperate with a similar set of clutch teeth 126 formed upon each of the various clutch devices 127 corresponding to the clutch actuating devices 38 of the preferred form of construction. The clutch devices 127 are provided with the sets of posts or fingers 40, the same as the devices 38 in the preferred form of construction, and hence are adapted to be actuated by engagement with the ribs 44 of the disc 45 as before. The devices 126 are adapted to be maintained normally out of clutched relation with the clutch teeth 125 by the action of a plurality of coil springs 128 interposed between each of the housing portions 31 and the corresponding clutch device 127.

Referring now to Figures 17, 18 and 19 of the drawings, these views illustrate still another form of clutch actuating means for connecting the disc 45 with the clutch devices. In this modified form of the construction, the housing portions 31 carried by the various sleeves 32 of the clutch devices on the shaft 26, are formed with drum portions 130 arranged in concentric relation, a similar drum portion 130 being formed upon the disc 39', corresponding to the disc 39 carried by the shaft 26 in the preferred form of the construction. There are thus provided four of the drum portions 130 spaced apart in concentric relation adapted to cooperate with a set of clutch elements for selective engagement for securing any one of the direct forward speeds or the reverse drive, as before. For engagement severally with the various drum portions 130, I provide a set of flexible clutch bands 132, there being two of these clutch band members 132 between each pair of adjoining drum portions 130, and each of the band members 132 being pivotally mounted at one end upon a pin 133 projecting rearward from the disc 42 into the space between said drum portions 130. At the free end of each of the clutch band members 132, the same is provided with a pair of spring elements 134, between which is mounted a block 135 for accommodating one end of a lever 136 fulcrumed on a post 137 projecting forward from the face of the disc 42. Each block 135 also accommodates one end of the second lever 138 also fulcrumed to a post 137 on the face of the disc 42. But whereas each lever 136 projects across the face of disc 42 to well nigh the center thereof, each of the levers 138 is provided with an operating lever 139 fulcrumed between posts 140 on the disc 42 and pivotally connected at 141 to the outer end of the lever 138, the inner ends of all of the levers 136 and 139 being arranged approximately the same distance from the center of the disc 42. By means of this construction the levers 136 are operable for expanding the clutch band members 132 into engagement with the drum portion 130 outside the corresponding clutch band elements, whereas the levers 139 are operable through the levers 138 to contract the said clutch band members, in an obvious manner. The inner ends of the levers 136 and 139 are adapted for selective engagement by lugs 142 provided on the rear face of the disc 45 as illustrated in Figures 18 and 19. The arrangement of the lugs 142 is such that the same are engaged simultaneously with each pair of levers 136 or 139 at opposite sides of the disc 42, and consequently operate simultaneously the levers 136 or 139 corresponding to either the inner or the outer clutch band members 132. A modified form of the screw clutch construction for the low and intermediate speed and the reverse drive connections is illustrated in Figures 20, 21 and 22. In this modified form, the gear wheel 106 of the reverse gearing is slidingly keyed upon the hub portion of the screw clutch member, the same as before, but in this modified construction the said screw clutch member 107′ is upon the opposite or rear side of the gear wheel 106, or within the rear end of the housing composed of the sections 27 and 28. The clutch disc 109′ is likewise located to the rear of the gear wheel 106, and provided with the clutch disc elements 110′ between said disc 109′ and the screw clutch member 107′. On account of this change in the position of the clutch elements 107′, 108′, 109′ and 110′ with relation to the gear wheel 106, the screw thread 108′ is, of course, turned in the opposite direction from that of the thread 108 in the form of the construction first described. This modified form of the construction, however, provides a more compact arrangement of the parts within the rear end of the housing sections 27 and 28, and furthermore makes possible the use of parts 109′, 110′ and 107′ of such a size as will afford a greater clutch surface than can be obtained in the screw clutch structure of the previous construction.

It will thus be apparent that I have devised a practical and efficient construction for carrying out the desired objects of the invention, the mechanism providing a most conveniently operable means for making all the required speed changes as well as the reverse drive connection, and it is apparent that the improved mechanism may be employed as a transmission for any type of drive requiring the described provision for changing the speed or reversing the direction of the drive. While I have illustrated and described what I now regard as the preferred form and arrangement of the construction, I desire to reserve the right to make such changes or modifications as may fairly fall within the scope of the appended claims.

What we claim is:

1. In a power transmission mechanism, the combination of driving and driven shafts, a plurality of change speed and reversing gears for operably connecting said shafts, a series of clutch devices respectively connected with said gears and concentrically arranged about the axis of said driving shaft and manually controlled means operable to selectively actuate said clutch devices.

2. In a power transmission mechanism, the combination of axially alined driving and driven shafts, a plurality of change speed and reversing gears for operably connecting said shafts, a series of concentrically arranged clutch devices respectively connected with said gears, and manually controlled means carried by said driving shaft opposite the faces of the said clutch devices and operable to selectively actuate the latter.

3. In a power transmission mechanism, the combination of axially alined driving and driven shafts, a plurality of change speed and reversing gears for operably connecting said shafts, a series of concentrically arranged clutch devices respectively connected with said gears, and clutch actuating means mounted for oscillatory movement upon said driving shaft and operable to selectively actuate said clutch devices.

4. In a power transmission mechanism, the combination of driving and driven shafts, a plurality of change speed and reversing gears for operably connecting said shafts, a series of concentrically arranged clutch devices respectively connected with said gears, said devices being provided with a series of posts held in different predetermined radial and relatively fixed positions, and manually controlled means for selectively engaging said posts for actuating said clutch devices.

5. In a power transmission mechanism, the combination of driving and driven shafts, a plurality of change speed and reversing gears for operably connecting said shafts, a series of concentrically arranged clutch devices respectively connected with said gears, said devices being provided with multiple disc clutch elements having a series of posts held in different predetermined radial and relatively fixed positions, and means for selectively engaging said posts for actuating said clutch devices.

6. In a power transmission mechanism, the combination of axially alined driving and driven shafts, a plurality of change speed and reversing gears for operably connecting said shafts, a series of concentrically arranged clutch devices respectively connected with said gears, said devices being provided with a series of posts held in different predetermined radial and relatively fixed positions, and clutch actuating means comprising a disc mounted on said driving shaft and provided with radial ribs adapted to be selectively engaged with said posts for actuating said clutch devices.

7. In a power transmission mechanism, the combination of axially alined driving and driven shafts, a plurality of change speed and reversing gears for operably connecting said shafts, a series of concentrically arranged clutch devices respectively connected with said gears, said devices being provided with a series of posts held in different predetermined radial and relatively fixed positions, clutch actuating means comprising a disc mounted on said driving shaft and provided with radial ribs adapted to be selectively engaged with said posts for actuating said clutch devices, means for holding said disc yieldingly in clutch-actuating position, and means for retracting said disc and oscillating the same to present said ribs in various different positions relatively to said clutch devices.

8. In a power transmission mechanism, the combination of axially alined driving and driven shafts, a plurality of change speed and reversing gears for operably connecting said shafts, a series of concentrically arranged clutch devices respectively connected with said gears, clutch actuating means comprising a disc mounted on said driving shaft and yieldingly actuated into clutch engaging position, and means for shifting said disc axially on said driving shaft and simultaneously oscillating the disc into different operative positions relatively to said clutch devices.

9. In a power transmission mechanism, the combination of axially alined driving and driven shafts, a plurality of change speed and reversing gears for operably connecting said shafts, a series of concentrically arranged clutch devices respectively connected with said gears, clutch actuating means comprising a disc mounted on said driving shaft and yieldingly actuated into clutch engaging position, said driving shaft being provided with a helical groove and said disc having a projection operating along said groove, and means for shifting said disc actually of the driving shaft, whereby said disc is oscillated into different operative positions relatively to said clutch devices.

10. In a power transmission mechanism, the combination of driving and driven shafts, a plurality of change speed and reversing gears for operably connecting said shafts, a series of clutch devices respectively connected with said gears and concentrically arranged about the axis of said driving shaft, a series of clutch-actuating elements arranged in different radial positions opposite the faces of said clutch devices, and an actuating member operative for selectively engaging said clutch actuating elements and thereby actuating the corresponding clutch devices.

11. In a power transmission mechanism, the combination of driving and driven shafts, a plurality of change speed and reversing gears for operably connecting said shafts, a series of clutch devices respectively connected with said gears and concentrically arranged about the axis of said driving shaft, a series of clutch-actuating elements arranged in different radial positions opposite the faces of said clutch devices, means for maintaining said clutch actuating elements in substantially fixed relation to each other while permitting movement thereof into and out of clutch actuating position, and an actuating member operative for selectively engaging said clutch-actuating elements and thereby actuating the corresponding clutch devices.

12. In a power transmission mechanism, the combination of driving and driven shafts, a plurality of change speed and reversing gears for operably connecting said shafts, a series of concentrically arranged clutch devices respectively connected with said gears, said devices being provided with multiple disc clutch elements having a series of posts projecting at different radial points from the faces of said clutch devices, means for maintaining said posts in substantially fixed relation to each other while permitting movement thereof into and out of clutch-actuating position, and an oscillating disc provided with radial ribs adapted to be selectively engaged with said posts for actuating said clutch devices.

13. In a power transmission mechanism, the combination of axially alined driving and driven shafts, a plurality of change speed and reversing gears for operably connecting said shafts, a series of concentrically arranged clutch devices respectively connected with said gears, said devices being provided with a series of posts projecting at different radial points from the faces of said clutch devices, a disc fixed to said driving shaft and having guide passages for maintaining said posts in substantially fixed relation to each other while permitting movement thereof into and out of clutch engaging position, and a second disc mounted for oscillating movement on said driving shaft and provided with radial ribs adapted to be selectively engaged with said posts for actuating said clutch devices.

14. A power transmission, as set forth in claim 13, in which the discs are provided with means for latching the same temporarily together and for unlatching said discs to permit the shifting movements of said oscillating disc with reference to the other disc.

15. A power transmission, as set forth in claim 13, in which said first disc is provided with a set of pins and said oscillating disc is provided with a corresponding set of openings adapted for engagement by said pins in the different relative positions of the discs, and also with means for shifting said oscillating disc into and out of engagement with said pins.

16. A power transmission comprising, in combination with driving and driven shafts, change speed and reversing gearing for operably connecting said shafts, clutch elements associated with said driven shaft, and means operated by said change speed and reversing gearing for actuating said clutch elements into clutched relation with said driven shaft.

17. A power transmission comprising, in combination with driving and driven shafts, clutch elements associated with said driven shaft, change speed gears and reversing gears for operably connecting said shafts, and screw-operated devices operable by either said change speed or reversing gears for actuating said clutch elements into clutched relation to said driven shaft.

18. A power transmission comprising, in combination with driving and driven shafts, clutch elements associated with said driven shaft, change speed gears and reversing gears for operably connecting said shafts, means for connecting said shafts together in direct drive relation, and means operated by either said change speed or reversing gears for actuating said clutch elements into clutch relation to said driven shaft, the last said means being adapted to be maintained automatically in unclutched relation when said shafts are connected in direct drive relation.

19. A power transmission comprising, in combination with driving and driven shafts, forward and reverse drive gearing for operably connecting said shafts, clutch elements associated with said driven shaft, means for connecting said shafts in direct drive relation, and screw-operated devices actuated by either said forward or reverse drive gearing for moving said clutch elements into clutched relation to said driven shaft, said devices being adapted to maintain said clutch elements in unclutched relation when said shafts are connected in direct drive relation.

In witness whereof I hereto affix my signature.

EARL J. KEARBY.